US009644551B2

(12) United States Patent
Marscheider et al.

(10) Patent No.: US 9,644,551 B2
(45) Date of Patent: May 9, 2017

(54) METHOD OF SUPPLYING FUEL TO ENGINE

(71) Applicant: Caterpillar Motoren GmbH & Co. KG, Kiel (DE)

(72) Inventors: Hannes Marscheider, Schülldorf (DE); Eike Joachim Sixel, Kiel (DE); Daniel Wester, Felde (DE); Thorsten Tuexen, Gettorf (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 142 days.

(21) Appl. No.: 14/753,098

(22) Filed: Jun. 29, 2015

(65) Prior Publication Data
US 2016/0003176 A1     Jan. 7, 2016

(30) Foreign Application Priority Data

Jul. 1, 2014   (EP) ..................... 14175222

(51) Int. Cl.
| F02D 41/00 | (2006.01) |
| F02D 19/06 | (2006.01) |
| F02D 41/34 | (2006.01) |
| F02M 43/04 | (2006.01) |
| F02M 45/00 | (2006.01) |
| F02M 63/00 | (2006.01) |

(52) U.S. Cl.
CPC ..... F02D 41/0027 (2013.01); F02D 19/0621 (2013.01); F02D 41/345 (2013.01); F02M 43/04 (2013.01); F02M 45/00 (2013.01); F02M 63/0012 (2013.01); *Y02T 10/36* (2013.01)

(58) Field of Classification Search
CPC ............ F02D 41/0027; F02D 41/0025; F02D 41/003; F02D 19/0621; F02M 21/0215; F02M 21/0218; F02M 21/0224; F02M 21/0239; F02M 21/0242; F02M 21/0245
See application file for complete search history.

(56) References Cited

U.S. PATENT DOCUMENTS

| 8,340,886 B2 * | 12/2012 | Nenmeni | ................. F02C 9/40 |
| | | | 123/520 |
| 2006/0225699 A1 * | 10/2006 | McLoughlin | ........... F02D 17/04 |
| | | | 123/350 |
| 2012/0186560 A1 * | 7/2012 | Lund | ................... F02D 19/0642 |
| | | | 123/495 |

(Continued)

*Primary Examiner* — Hung Q Nguyen
*Assistant Examiner* — Xiao Mo

(57) ABSTRACT

A method for supplying fuel to an engine is disclosed. The method may include regulating a gas admission valve disposed between a gaseous fuel line and a cylinder intake port to reduce flow of gaseous fuel to the cylinder. The method may also include closing a shut-off valve disposed between a gaseous fuel reservoir and the gaseous fuel line to restrict flow of gaseous fuel from the gaseous fuel reservoir to the gaseous fuel line. Further, the method may include actuating an inert gas inlet valve disposed between an inert gas reservoir and the gaseous fuel line to supply inert gas to the gaseous fuel line and flush the gaseous fuel in the gaseous fuel line into the cylinder via the gas admission valve. Additionally, the method may include closing the inert gas inlet valve to restrict supply of inert gas to the gaseous fuel line.

20 Claims, 2 Drawing Sheets

(56) References Cited

U.S. PATENT DOCUMENTS

2012/0247421 A1* 10/2012 Reitz .................... F02B 1/14
                                                    123/299
2015/0252741 A1*  9/2015 Sixel ................ F02D 19/0642
                                                    123/472
2015/0354520 A1* 12/2015 Bleyer .............. F02M 63/0031
                                                    123/445

* cited by examiner

METHOD OF SUPPLYING FUEL TO ENGINE

CLAIM FOR PRIORITY

This application claims benefit of priority of European Patent Application No. 14175222.0, filed Jul. 1, 2014, which is incorporated herein by reference.

TECHNICAL FIELD

The present disclosure relates to a fuel supply system for an engine, and more particularly to a fuel supply system and a method of supplying fuel to an engine

BACKGROUND

A dual fuel internal combustion or a gaseous fuel engine may be used to power various types of machines. In case of duel fuel engine, the engine typically includes a fuel supply system having a gaseous fuel supply system for supplying gaseous fuel and a liquid fuel supply system for supplying liquid fuel to the engine. The gaseous fuel supply system may be associated with an inert gas supply system that may be used for flushing gaseous fuel present in a gaseous fuel line after termination of a gaseous fuel operation of the engine or during a transition from a gaseous fuel operation to a liquid fuel operation of the engine. After flushing gaseous fuel, the mixture of gaseous fuel and inert gas is typically vented to atmosphere. However, such practice of releasing gaseous fuel to atmosphere may not be desirable as it leads to atmospheric pollution.

SUMMARY OF THE DISCLOSURE

In one aspect of the present disclosure, a method for supplying fuel to a dual fuel engine or a gaseous fuel engine is disclosed. The method includes regulating a gas admission valve disposed between a gaseous fuel line and an intake port of a cylinder of the engine to reduce flow of gaseous fuel to the cylinder. A shut-off valve, disposed between a gaseous fuel reservoir or a gaseous fuel supply to the engine, and the gaseous fuel line, is closed to restrict flow of gaseous fuel from the gaseous fuel reservoir to the gaseous fuel line. Further, an inert gas inlet valve, disposed between an inert gas reservoir, or an inert gas supply, and the gaseous fuel line, is actuated to supply inert gas to the gaseous fuel line and to flush gaseous fuel remaining in the gaseous fuel line into the cylinder via the gas admission valve. The inert gas inlet valve is closed to restrict supply of inert gas to the gaseous fuel line. In an embodiment, the gaseous fuel line attached to the engine may be a gas pipe.

In an embodiment of the present disclosure, the method further includes opening the gas admission valve during the supply of inert gas to the gaseous fuel line and supplying liquid fuel into the cylinder of the engine via a fuel injector. The inert gas along with the gaseous fuel in the gaseous fuel line may enter into the cylinder. The gas admission valve is closed after a predetermined duration is elapsed. The predetermined duration is estimated based on a first relationship between a flow rate of liquid fuel supplied into the cylinder and an engine power. The inert gas remaining in the gaseous fuel line may be released to atmosphere. The inert gas remaining in the gaseous fuel line may also be released to the cylinder of the engine.

In another embodiment of the present disclosure, the method further includes opening the gas admission valve during the supply of inert gas to the gaseous fuel line and supplying liquid fuel into the cylinder of the engine via the fuel injector. The inert gas along with the gaseous fuel in the gaseous fuel line may enter into the cylinder. The gas admission valve is closed after energy, calculated based on a second relationship between a flow rate of liquid fuel supplied into the cylinder and an engine power, or the flow rate of the liquid fuel supplied into the cylinder, is constant. The inert gas remaining in the gaseous fuel line may be released to atmosphere. The inert gas remaining in the gaseous fuel line may also be released to the cylinder of the engine.

In yet another embodiment of the present disclosure, the method further includes supplying the inert gas to the gaseous fuel line so that inert gas passes through the gas admission valve along with the remaining gaseous fuel in the gaseous fuel line into the cylinder through a clearance, or a normal leakage, of the gas admission valve.

In another aspect of the present disclosure, a fuel supply system for an engine is disclosed. The fuel supply system includes a gaseous fuel supply system. The gaseous fuel supply system includes a gaseous fuel reservoir configured to store gaseous fuel therein. A gaseous fuel line is fluidly communicated between the gaseous fuel reservoir and an intake port of a cylinder of the engine. A shut-off valve is disposed in the gaseous fuel line and configured to regulate a flow of gaseous fuel from the gaseous fuel reservoir. A gas admission valve is disposed between the gaseous fuel line and the intake port of the cylinder. The gas admission valve is configured to regulate a flow of gaseous fuel from the gaseous fuel line to the intake port. The fuel supply system further includes an inert gas supply system that is fluidly communicated with the gaseous fuel line. The inert gas supply system includes an inert gas reservoir configured to store inert gas therein and an inert gas inlet valve configured to regulate a flow of inert gas to the gaseous fuel line. A controller is communicated with the gaseous fuel supply system and the inert gas supply system. The controller is configured to regulate the gas admission valve to reduce flow of gaseous fuel into the cylinder. The shut-off valve is closed to restrict flow of gaseous fuel from the gaseous fuel reservoir to the gaseous fuel line. The inert gas inlet valve is actuated to supply inert gas to the gaseous fuel line and to flush gaseous fuel remaining in the gaseous fuel line into the cylinder via the gas admission valve. The gas admission valve is closed after a predetermined duration that is estimated based on a first relationship between a flow rate of liquid fuel supplied into the cylinder and an engine power. In another embodiment, the gas admission valve is closed after energy, calculated based on a second relationship between a flow rate of liquid fuel supplied into the cylinder and an engine power, or the flow rate of the liquid fuel supplied into the cylinder, is constant. The inert gas inlet valve is closed to restrict supply of inert gas to the gaseous fuel line.

Other features and aspects of this disclosure will be apparent from the following description and the accompanying drawings.

DETAILED DESCRIPTION

Figure 1:
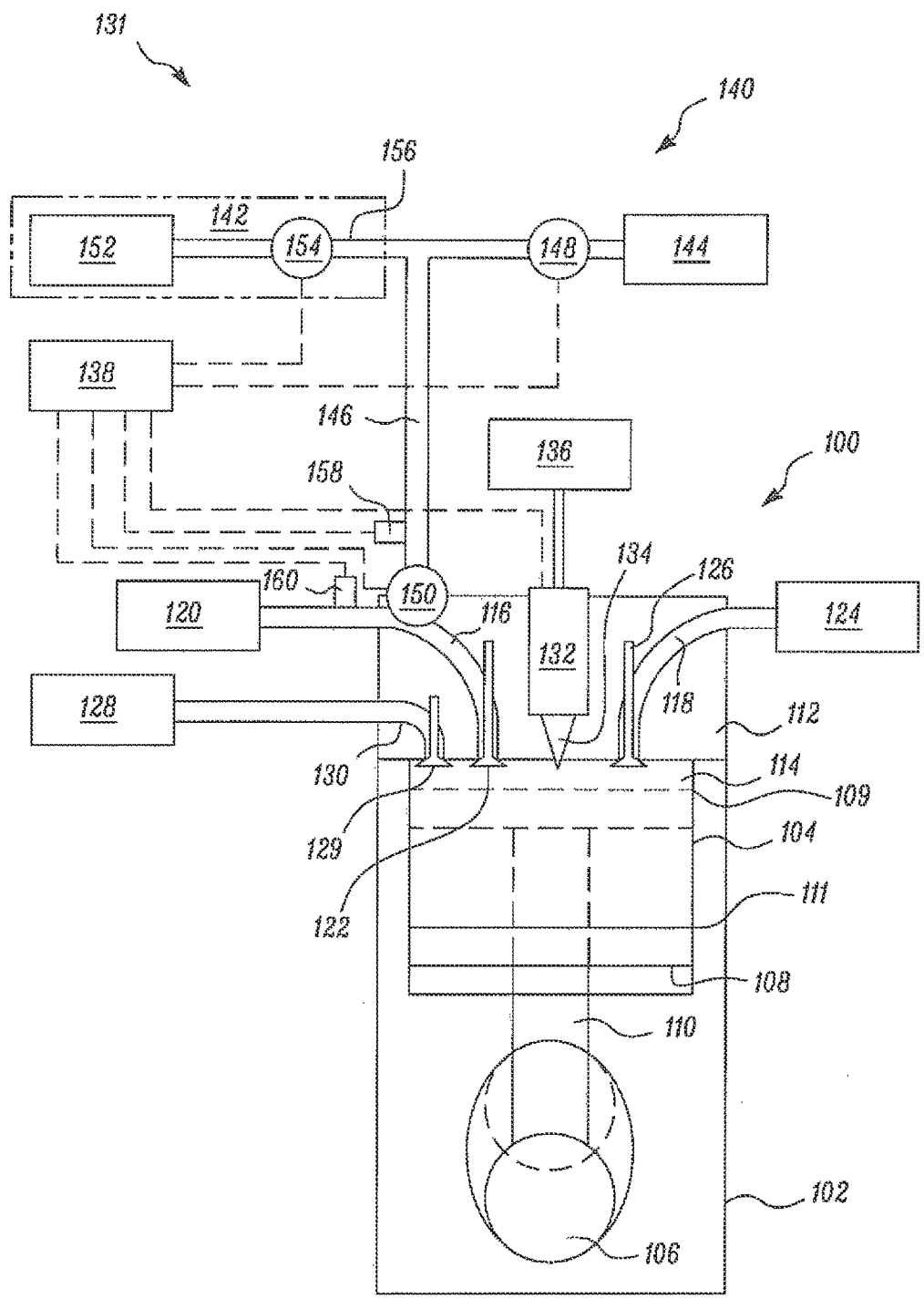
FIG. 1 is a schematic representation of an exemplary dual fuel internal combustion engine, according to an embodiment of the present disclosure.
Figure 2:
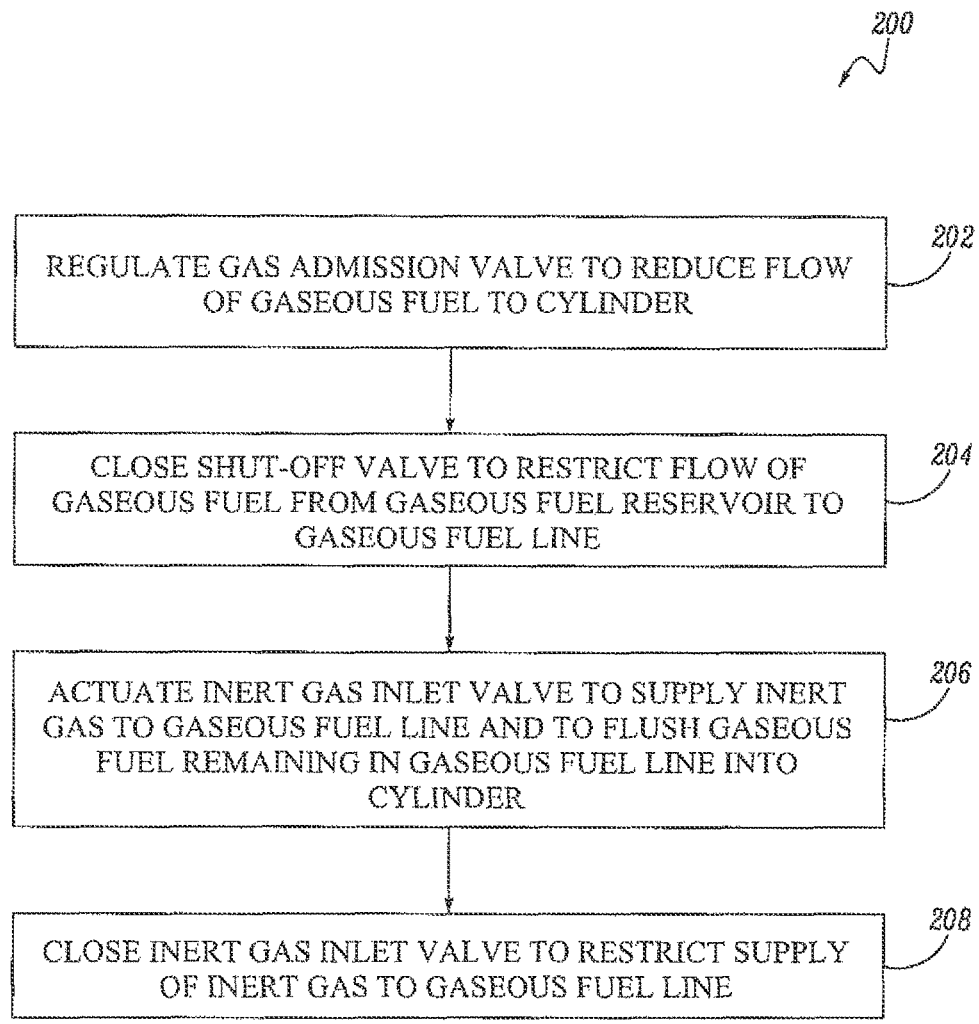
FIG. 2 is a flow chart illustrating a method of supplying fuel to the dual fuel internal combustion, according to an embodiment of the present disclosure.

FIG. 1 shows a schematic representation of an exemplary dual fuel internal combustion engine 100, according to an embodiment of the present disclosure. The engine 100 may be propelled by a gaseous fuel such as, for example, natural gas, propane, methane, hydrogen, and the like, and a liquid fuel that may be, for example, gasoline or diesel. The dual fuel engine 100 of the present disclosure may be used in marine vessels. However, the dual fuel engine 100 may also be used in machines used for the purpose of construction, mining, agriculture, power generation and other known industries.

The engine 100 may include a cylinder block 102 for defining one or more cylinders 104 therein. In the case of multiple cylinders, the cylinders 104 may be arranged in various configurations within the cylinder block 102 such as, for example, inline, rotary, v-type, etc. For illustration purposes, only one cylinder 104 is shown in FIG. 1. The cylinder block 102 may further include a crankshaft 106 that may be rotatably supported in the cylinder block 102. A piston 108 may be slidably disposed within the cylinder 104 and pivotally coupled with one end of a connecting rod 110. Another end of the connecting rod 110 may be coupled to the crankshaft 106. Thus the piston 108 and the crankshaft 106 may be operatively coupled with each other via the connecting rod 110. The piston 108 may be movable between a top dead center 109 and a bottom dead center 111 within the cylinder 104 to define one stroke. The top dead center 109 may be defined as a maximum extent to which the piston 108 may travel during an upward stroke of the piston 108. The bottom dead center 111 may be defined as a maximum extent to which the piston 108 may travel during a downward stroke of the piston 108.

A cylinder head 112 may be disposed on a top surface of the cylinder 104 to enclose the cylinder 104. A combustion chamber 114 may be defined within the cylinder 104 between the cylinder head 112 and the top dead center 109 of the piston 108 during upward stroke thereof. The usage of the term 'fuel' hereinafter may be considered as either gaseous fuel or liquid fuel unless otherwise specifically termed as 'gaseous fuel' or 'liquid fuel'.

The cylinder head 112 includes an intake port 116 and an exhaust port 118. The intake port 116 may be in fluid communication with the cylinder 104 and a charge air system 120. The charge air system 120 may be fluidly connected to the intake port 116 via an intake manifold (not shown). In the case of engine 100 with multiple cylinders 104, the intake manifold may be fluidly disposed between the charge air system 120 and the intake port 116 of each of the cylinders 104 to distribute air supply to each cylinder 104 substantially at same pressure. The charge air system 120 may include an air cleaner, and compressor and/or turbo charger (not shown) for receiving air from ambient, pressurizing and filtering the air. The filtered air may be supplied to the cylinder 104 through the intake port 116 during a suction stroke of the piston 108. The suction stroke may be defined as a downward stroke of the piston 108 from the top dead center 109 to the bottom dead center 111. The intake port 116 may be provided with an inlet valve 122 that may selectively allow air to enter into the cylinder 104 upon actuation thereof. The inlet valve 122 may be actuated by an arrangement having a rocker arm and a camshaft such as those known in the art. In other embodiments, each cylinder 104 may include two or more intake ports (not shown) for supplying ambient air into the cylinder 104 during the suction stroke of the piston 108.

The exhaust port 118 may be in fluid communication with the cylinder 104 and an exhaust gas system 124. The exhaust gas system 124 may be fluidly connected to the exhaust port 118 via an exhaust manifold (not shown). In the case of engine 100 with multiple cylinders 104, the exhaust manifold may be fluidly disposed between the exhaust gas system 124 and the exhaust port 118 of each of the cylinders 104 to exit exhaust gas from each cylinder 104 to atmosphere. The exhaust gas system 124 may include, among other components, a silencer for reducing noise that may be generated by the engine 100. In other embodiments, the exhaust gas system 124 may include a turbine of a turbo charger, an exhaust gas recirculation system and/or an exhaust gas after treatment system. The exhaust port 118 may be provided with an exhaust valve 126 that may selectively exit the exhaust to atmosphere upon actuation of the exhaust valve 126 via the exhaust gas system 124. The exhaust valve 126 may be actuated by the arrangement having the rocker arm and the camshaft. In other embodiments, each cylinder 104 may include two or more exhaust ports (not shown) to exit the exhaust gas from the cylinder 104 during an exhaust stroke of the piston 108. The exhaust stroke may be defined as an upward stroke of the piston 108 from the bottom dead center 111 to the top dead center 109.

The cylinder 104 of the engine 100 may be further fluidly communicated with an instrument air system 128 via an instrument air port 130 that is provided in the cylinder head 112. A starter valve 129 may be disposed in the instrument air port 130 to allow or restrict flow of instrument air into the cylinder 104. The instrument air system 128 may include an air compressor (not shown) for providing pressurized air into the cylinder 104 and/or may include an air filter (not shown).

A fuel supply system 131 may be fluidly communicated with the cylinder 104 of the engine 100. The fuel supply system 131 includes a fuel injection system 132 that may be disposed on the cylinder head 112 to inject liquid fuel into the cylinder 104 via at least one fuel injector 134. The fuel injection system 132 may be further fluidly communicated with a liquid fuel supply system 136 to receive liquid fuel therethrough. In an embodiment, the liquid fuel supply system 136 may include a first liquid fuel tank for storing, for example, heavy fuel oil (HFO), diesel, gasoline and a second liquid fuel tank for storing, for example, diesel or gasoline. In another embodiment, the fuel injection system 132 may include one fuel injector for injecting liquid fuel into the cylinder 104 in a liquid fuel mode of the engine 100 and an ignition fuel injector for injecting, for example a small amount of diesel as ignition energy in a gaseous fuel mode of the engine 100. In yet another embodiment, the fuel injection system 132 may include one fuel injector for injecting liquid fuel in the liquid fuel mode and pilot amount of liquid fuel in the gaseous fuel mode. In various embodiments, an ignition device (not shown) such as spark plug may be disposed in the cylinder head 112 in communication with the cylinder 104 for initiating combustion process during the gaseous fuel mode. The fuel injection system 132 may be electrically communicated with a controller 138 to selectively inject liquid fuel into the cylinder 104.

The fuel supply system 131 further includes a gaseous fuel supply system 140 and an inert gas supply system 142. The gaseous fuel supply system 140 includes a gaseous fuel reservoir 144 for storing gaseous fuel therein, or a fuel supply connected to a gaseous supply grid (not shown). The gaseous fuel reservoir 144 may be fluidly communicated with the intake port 116 via a gaseous fuel line 146. In an embodiment, the gaseous fuel line attached to the engine may be a gas pipe. A shut-off valve 148 valve may be disposed in the gaseous fuel line 146 and electrically communicated with the controller 138. The shut-off valve 148 may selectively allow or restrict a flow of gaseous fuel from the gaseous fuel reservoir 144 to the gaseous fuel line 146. Additionally, a venting valve (not shown) may be disposed in the gaseous fuel line 146 and electrically communicated with the controller 138 to release remaining fuel and/or inert gas in the gaseous fuel line 146 upon receipt of a control signal from the controller 138. Apart from the shut-off valve 148 and the venting valve, it may be contemplated that different control valves may be disposed between the gaseous fuel reservoir 144 and the gaseous fuel line 146 to control a flow of gaseous fuel from the gaseous fuel reservoir 144. The control valves may be electrically actuated by the controller 138.

The gaseous fuel supply system 140 may further include a gas admission valve 150 that may be disposed between the gaseous fuel line 146 and the intake port 116 of the engine 100. Further, the gas admission valve 150 may be communicated with the gaseous fuel reservoir 144 via the gaseous fuel line 146. The gas admission valve 150 may be a solenoid operated valve and may be electrically communicated with the controller 138. The gas admission valve 150 may selectively allow or restrict a flow of gaseous fuel from the gaseous fuel line 146 to the intake port 116. Further, the gas admission valve 150 may be further configured to regulate a flow of gaseous fuel from the gaseous fuel line 146 to the intake port 116 based on a signal from the controller 138. Gaseous fuel may mix with air received from the charge air system 120 within the intake port 116.

The inert gas supply system 142 may be fluidly communicated with the gaseous fuel line 146 of the gaseous fuel supply system 140. The inert gas supply system 142 may include an inert gas reservoir 152 for storing inert gas therein and an inert gas inlet valve 154 that may be communicated with the inert gas reservoir 152. The inert gas inlet valve 154 may be further communicated with the gaseous fuel line 146 of the gaseous fuel supply system 140 via an inert gas line 156. The inert gas inlet valve 154 may be electrically communicated with the controller 138 to receive a control signal. The inert gas inlet valve 154 may selectively allow or restrict a flow of inert gas to the gaseous fuel line 146.

The controller 138 may be further communicated with a first sensor 158 disposed in the gaseous fuel line 146 upstream of the gas admission valve 150. The first sensor 158 may be a pressure sensor. The first sensor 158 may be disposed in the gaseous fuel line 146 to communicate the pressure of the gaseous fuel in the gaseous fuel line 146 to the controller 138. Further, the controller 138 may be communicated with a second sensor 160 that is fluidly disposed between the charge air system 120 and the intake port 116 of the engine 100. The second sensor 160 may be a pressure sensor configured to communicate the pressure of the mixture of air and gaseous fuel in the intake port 116 to the controller 138. In another embodiment, the sensor 160 may be fluidly disposed in the charge air system 120 configured to communicate the pressure of the air in the charge air system 120 to the controller 138. Thus, the first sensor 158 and the second sensor 160 may enable the controller 138 to monitor a pressure difference between the gaseous fuel line 146 and the intake port 116.

In an embodiment, the controller 138 may include a central processing unit, a memory and input/output ports that facilitates communication with the various components including, but not limited to, the gas admission valve 150, the shut-off valve 148, the inert gas inlet valve 154, the fuel injection system 132, and the first and second sensors 158, 160. The controller 138 may also include input/output ports that facilitate the electric power supply for the various actuators. Referring to FIG. 1, communication of the controller 138 with the various components is represented with a dotted line. One skilled in the art will appreciate that any computer based system or a device that utilizes similar components may be adapted for use with the present disclosure.

In the gaseous fuel mode of the engine 100, the controller 138 may send control signal to the shut-off valve 148 to allow flow of gaseous fuel from the gaseous fuel reservoir 144 to the gaseous fuel line 146. The various control valves disposed between the gaseous fuel reservoir 144 and the gaseous fuel line 146 may also be actuated to control flow of gaseous fuel from the gaseous fuel reservoir 144. Further, the controller 138 communicates with the gas admission valve 150 to regulate flow of gaseous fuel from the gaseous fuel line 146 to the intake port 116. The gas admission valve 150 may periodically switch between the open condition and the closed condition. Further, the gas admission valve may be retained in the open position for an opening duration thereof in each cycle of operation of the engine 100. The opening duration may be regulated to control power of the engine 100. In the intake port 116, the gaseous fuel may be mixed with air received from the charge air system 120. The gas admission valve 150 may be configured to mix gaseous fuel with air in a predetermined ratio by controlling a flow rate of gaseous fuel. The mixing of gaseous fuel with the air in the predetermined ratio may be based on volume of gaseous fuel required during combustion process into the combustion chamber 114. The instrument air system 128 may supply pressurized air into the combustion chamber 114 for enabling combustion process in the combustion chamber 114. Also, heavy fuel oil or a pilot amount of liquid fuel may be injected to the combustion chamber 114 through the fuel injector 134 to initiate combustion In the liquid fuel mode of the engine 100, the controller 138 may actuate the shut-off valve 148 and the gas admission valve 150 to restrict flow of gaseous fuel from the gaseous fuel reservoir 144 to the intake port 116. The controller 138 may actuate the fuel injection system 132 to inject liquid fuel received from the liquid fuel supply system 136 into the combustion chamber 114 during the last part of a compression stroke of the engine 100.

During the transition from the gaseous fuel mode to the liquid fuel mode, the controller 138 sends control signal to the gas admission valve 150 and regulates the gas admission valve 150 to reduce flow of gaseous fuel from the gaseous fuel line 146 to the intake port 116 of the engine 100. Specifically, the controller 138 may communicate with the gas admission valve 150 to actuate the gas admission valve 150 to decrease the opening duration. Simultaneously, the controller 138 may send control signal to the gaseous fuel supply system 140 to decrease the pressure in the gaseous fuel line 146.

The controller 138 may further send control signal to the shut-off valve 148 to restrict flow of gaseous fuel from the gaseous fuel reservoir 144 to the gaseous fuel line 146. However, some amount of gaseous fuel may remain in the gaseous fuel line 146 between the shut-off valve 148 and the gas admission valve 150. It may be contemplated that some amount of gaseous fuel may be entered into the cylinder 104 through a clearance in the gas admission valve 150. The clearance may be defined as a gap formed between mating surface of a movable valve body (not shown) and a valve seat (not shown) in the gas admission valve 150 during a closed condition thereof. The gap may be formed due to construction of the gas admission valve 150 or wear of the mating surfaces due to prolonged use of the gas admission valve 150.

The controller 138 may actuate the inert gas inlet valve 154 of the inert gas supply system 142 to allow flow of inert gas from the inert gas reservoir 152 to the gaseous fuel line 146 via the inert gas line 156. Inert gas supplied from the inert gas reservoir 152 may apply a pressure in the gaseous fuel line 146 and flush gaseous fuel remaining in the gaseous fuel line 146 into the cylinder 104 through the gas admission valve 150. In an embodiment of the present disclosure, when inert gas is supplied to the gaseous fuel line 146, the controller 138 may actuate the gas admission valve 150 so that the gas admission valve 150 starts opening from the closed condition thereof. The opening of the gas admission valve 150 may also be regulated by the controller 138 for a predetermined minimum period. The controller 138 may actuate the fuel injection system 132 to start supplying liquid fuel to the combustion chamber 114 through the liquid fuel supply system 136. The controller 138 may actuate the gas admission valve 150 to the closed condition thereof after a predetermined duration is elapsed. The predetermined duration is estimated based on a first relationship between a flow rate of liquid fuel supplied to the combustion chamber 114 and a power of the engine 100. For example, a ratio between a product of the flow rate of liquid fuel and a lower heating value of liquid fuel, and a power generated by the engine 100 may be utilized to determine the predetermined duration. In another embodiment, the gas admission valve 150 may be actuated by the controller 138 to close the gas admission valve 150 after an energy calculated based on a second relationship between a flow rate of liquid fuel supplied into the cylinder and an engine power or a flow rate of liquid fuel supplied into the combustion chamber 114 is constant. The controller 138 may actuate the inert gas inlet valve 154 to close the inert gas inlet valve 154, and restrict the supply of inert gas from the inert gas supply system 142.

In another embodiment of the present disclosure, the controller 138 may actuate the inert gas inlet valve 154 to allow flow of inert gas from the inert gas reservoir 152 to the gaseous fuel line 146 via the inert gas line 156. Inert gas supplied from the inert gas reservoir 152 may flush gaseous fuel remaining in the gaseous fuel line 146 into the combustion chamber 114 through the clearance of the gas admission valve 150. The controller 138 may actuate the inert gas inlet valve 154 to keep the inert gas inlet valve 154 opened for a predetermined time. In the predetermined time, gaseous fuel remaining in the gaseous fuel line 146 may be entered into the combustion chamber 114 through the clearance, or normal leakage of the gas admission valve 150. The controller 138 may actuate the inert gas inlet valve 154 to close the inert gas inlet valve 154 and restrict the supply of inert gas from the inert gas supply system 142. Further, the controller 138 may regulate the venting valve to allow inert gas remaining in the gaseous fuel line 146 and the inert gas line 156 to the atmosphere.

INDUSTRIAL APPLICABILITY

A dual fuel engine or a gaseous fuel engine may be used in marine vessels, locomotives and various types of machines used for the purpose of construction, mining, agriculture, power generation and other industries. The dual fuel engine may selectively operate in a gaseous fuel mode and a liquid fuel mode. During a transition from the gaseous fuel mode to the liquid fuel mode or termination of a gaseous fuel mode, some amount of gaseous fuel may remain in the gaseous fuel line of a gaseous fuel supply system. A venting valve associated with the gaseous fuel supply system may be actuated to release gaseous fuel remaining in the gaseous fuel line to atmosphere. The emission of such gaseous fuel may cause atmospheric pollution.

The present disclosure relates to the fuel supply system 131 and a method 200 for supplying fuel to the dual fuel engine 100. The dual fuel engine 100 operates selectively in the gaseous fuel mode and the liquid fuel mode. In the gaseous fuel mode, the controller 138 may actuate the shut-off valve 148 to allow flow of gaseous fuel from the gaseous fuel reservoir 144 to the gaseous fuel line 146. Further, the controller 138 may actuate the gas admission valve 150 to regulate flow of gaseous fuel from the gaseous fuel line 146 into the combustion chamber 114 through the intake port 116. In the gaseous fuel mode, the inert gas supply system 142 may be inactive. In the liquid fuel mode, the controller 138 may actuate the shut-off valve 148 and the gas admission valve 150 to restrict flow of gaseous fuel from the gaseous fuel reservoir 144 to the combustion chamber 114. The controller 138 may actuate the fuel injection system 132 to inject liquid fuel received through the liquid fuel supply system 136 into the combustion chamber 114. Thus, the controller 138 is configured with the fuel supply system 131 to operate the engine 100 between the gaseous fuel mode and the liquid fuel mode.

During the transition from the gaseous fuel mode to the liquid fuel mode, the method 200, at step 202, includes regulating the gas admission valve 150 via the controller 138. Upon receipt of control signal from the controller 138, the gas admission valve 150 moves from the open condition towards the closed condition to decrease opening duration thereof and thereby reduces the flow of gaseous fuel from the gaseous fuel line 146 to the combustion chamber 114.

At step 204, the controller 138 may further actuate the shut-off valve 148 to restrict the flow of gaseous fuel from the gaseous fuel reservoir 144 to the gaseous fuel line 146. Thus, the controller 138 may completely shut down the gaseous fuel supply system 140. However, some amount of gaseous fuel may remain in the gaseous fuel line 146 between the shut-off valve 148 and the gas admission valve 150.

At step 206, the controller 138 may actuate the inert gas inlet valve 154 to allow flow of inert gas from the inert gas reservoir 152 to the gaseous fuel line 146. Inert gas supplied from the inert gas reservoir 152 may apply the pressure in the gaseous fuel line 146 and flush gaseous fuel remaining in the gaseous fuel line 146 to the cylinder 104 through the gas admission valve 150. In an embodiment, when inert gas is supplied to the gaseous fuel line 146, the controller 138 may actuate the gas admission valve 150 to open the gas admission valve 150. The controller 138 may actuate the fuel injection system 132 to start supplying liquid fuel to the combustion chamber 114 through the liquid fuel supply system 136. The gas admission valve 150 may be closed after the predetermined duration is elapsed. In another embodiment, the gas admission valve 150 may be closed after energy, calculated based on the second relationship between the flow rate of liquid fuel supplied into the cylinder and the engine power or the flow rate of liquid fuel supplied to the combustion chamber 114 is constant. At step 208, the controller 138 may communicate with the inert gas inlet valve 154 to close the inert gas inlet valve 154 and thereby shut down the inert gas supply system 142.

In another embodiment of the present disclosure, inert gas supplied from the inert gas reservoir 152 may apply the pressure in the gaseous fuel line 146 and flush gaseous fuel remaining in the gaseous fuel line 146 to the combustion chamber 114 through the clearance, or the normal leakage, of gas admission valve 150. The inert gas inlet valve 154 may be kept open for the predetermined time. Thus, gaseous fuel remaining in the gaseous fuel line 146 along with part of inert gas may be entered into the combustion chamber 114 through the clearance of the gas admission valve 150. The controller 138 may close the inert gas inlet valve 154 to shut down the inert gas supply system 142. Further, the controller 138 may actuate the venting valve to release inert gas remaining in the gaseous fuel line 146 to atmosphere. Subsequently, the engine 100 starts operating in the liquid fuel mode.

It may be contemplated that the method 200, as described above, may also be used in a gaseous fuel engine to consume gaseous fuel remaining in a gaseous fuel line in the combustion chamber during termination of an engine operation. It may be apparent to a person ordinarily skilled in the art, that the method 200, when applied to a gaseous fuel engine, will not include actuation of liquid fuel supply.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A method for supplying fuel to a dual-fueled internal combustion engine or a gaseous-fueled internal combustion engine, the method comprising:
    regulating a gas admission valve disposed between a gaseous fuel line and an intake port of a cylinder of the engine to reduce flow of gaseous fuel to the cylinder;
    closing a shut-off valve disposed between a gaseous fuel reservoir and the gaseous fuel line to restrict flow of gaseous fuel from the gaseous fuel reservoir to the gaseous fuel line;
    actuating an inert gas inlet valve disposed between an inert gas reservoir and the gaseous fuel line to supply inert gas to the gaseous fuel line and to flush gaseous fuel remaining in the gaseous fuel line into the cylinder via the gas admission valve; and
    closing the inert gas inlet valve to restrict supply of inert gas to the gaseous fuel line.

2. The method of claim 1, wherein regulating the gas admission valve comprises actuating the gas admission valve to decrease an opening duration of the gas admission valve.

3. The method of claim 1, further comprising:
    opening the gas admission valve during the supply of inert gas to the gaseous fuel line;
    supplying liquid fuel into the cylinder of the engine via a fuel injector; and
    closing the gas admission valve after a predetermined duration is elapsed.

4. The method of claim 3, wherein the predetermined duration is estimated based on a first relationship between a flow rate of liquid fuel supplied into the cylinder and an engine power.

5. The method of claim 3, further comprising:
    opening the gas admission valve during the supply of inert gas to the gaseous fuel line;
    supplying liquid fuel into the cylinder of the engine via the fuel injector; and
    closing the gas admission valve after an energy calculated based on a second relationship between a flow rate of liquid fuel supplied into the cylinder and an engine power or a flow rate of liquid fuel supplied into the cylinder is constant.

6. The method of claim 1, further comprising releasing inert gas to atmosphere.

7. The method of claim 1, further comprising supplying inert gas to the gaseous fuel line so that inert gas passes through the gas admission valve along with the remaining gaseous fuel in the gaseous fuel line into the cylinder due to a clearance of the gas admission valve.

8. A fuel supply system for an internal combustion engine, the fuel supply system comprising:
    a gaseous fuel supply system comprising:
        a gaseous fuel reservoir configured to store gaseous fuel therein;
        a gaseous fuel line fluidly communicated between the gaseous fuel reservoir and an intake port of a cylinder of the engine;
        a shut-off valve disposed in the gaseous fuel line and configured to regulate a flow of gaseous fuel from the gaseous fuel reservoir; and
        a gas admission valve disposed between the gaseous fuel line and the intake port of the cylinder, the gas admission valve configured to regulate a flow of gaseous fuel from the gaseous fuel line to the intake port;
    an inert gas supply system fluidly communicated with the gaseous fuel line, wherein the inert gas supply system comprising an inert gas reservoir configured to store inert gas therein and an inert gas inlet valve configured to regulate a flow of inert gas to the gaseous fuel line; and
    a controller communicated with the gaseous fuel supply system and the inert gas supply system, the controller is configured to:
        regulate the gas admission valve to reduce flow of gaseous fuel into the cylinder;
        close the shut-off valve to restrict flow of gaseous fuel from the gaseous fuel reservoir to the gaseous fuel line;
        actuate the inert gas inlet valve to supply inert gas to the gaseous fuel line and to flush gaseous fuel remaining in the gaseous fuel line into the cylinder via the gas admission valve; and
        close the inert gas inlet valve to restrict supply of inert gas to the gaseous fuel line.

9. The fuel supply system of claim 8, wherein the controller actuates the gas admission valve to decrease an opening duration of the gas admission valve.

10. The fuel supply system of claim 8, wherein the controller is configured to:
    open the gas admission valve during the supply of inert gas to the gaseous fuel line;
    supply liquid fuel into the cylinder of the engine via a fuel injector; and
    close the gas admission valve after a predetermined duration is elapsed.

11. The fuel supply system of claim 10, wherein the predetermined duration is estimated based on a first relationship between a flow rate of liquid fuel supplied into the cylinder and an engine power.

12. The fuel supply system of claim 10, wherein the controller is configured to:

open the gas admission valve during the supply of inert gas to the gaseous fuel line;

supply liquid fuel into the cylinder of the engine via the fuel injector; and close the gas admission valve after an energy calculated based on a second relationship between a flow rate of liquid fuel supplied into the cylinder and an engine power or a flow rate of liquid fuel supplied into the cylinder is constant.

13. The fuel supply system of claim 8, wherein the controller is configured to release inert gas to atmosphere.

14. The fuel supply system of claim 8, wherein the controller is configured to supply inert gas to the gaseous fuel line so that inert gas passes through the gas admission valve along with the remaining gaseous fuel in the gaseous fuel line into the cylinder due to a clearance of the gas admission valve.

15. The fuel supply system of claim 8, wherein the engine is used in a marine vessel.

16. An engine comprising:
   a cylinder;
   a piston reciprocatingly disposed within the cylinder;
   a crankshaft;
   a connecting rod connecting the piston to the crankshaft;
   an intake port configured to direct air into the cylinder;
   a fuel injector configured to inject liquid fuel into the cylinder;
   a gaseous fuel reservoir configured to store gaseous fuel;
   a gaseous fuel line fluidly communicated between the gaseous fuel reservoir and the intake port;
   a shut-off valve disposed in the gaseous fuel line and configured to regulate a flow of gaseous fuel from the gaseous fuel reservoir;
   a gas admission valve disposed between the gaseous fuel line and the intake port of the cylinder, the gas admission valve configured to regulate a flow of gaseous fuel from the gaseous fuel line to the intake port;
   an inert gas reservoir configured to store inert gas;
   an inert gas inlet valve configured to regulate a flow of inert gas to the gaseous fuel line; and
   a controller programmed to:
      regulate the gas admission valve to reduce flow of gaseous fuel into the cylinder;
      close the shut-off valve to restrict flow of gaseous fuel from the gaseous fuel reservoir to the gaseous fuel line;
      actuate the inert gas inlet valve to supply inert gas to the gaseous fuel line and to flush gaseous fuel remaining in the gaseous fuel line into the cylinder via the gas admission valve; and
      close the inert gas inlet valve to restrict supply of inert gas to the gaseous fuel line.

17. The engine of claim 16, wherein the controller is configured to actuate the gas admission valve to decrease an opening duration of the gas admission valve.

18. The engine of claim 16, wherein the controller is further configured to:
   open the gas admission valve during the supply of inert gas to the gaseous fuel line;
   actuate the fuel injector to supply liquid fuel into the cylinder; and
   close the gas admission valve after a predetermined duration.

19. The fuel supply system of claim 18, wherein the predetermined duration is based on a flow rate of liquid fuel supplied into the cylinder and an engine power.

20. The fuel supply system of claim 16, wherein the controller is configured to supply inert gas to the gaseous fuel line so that inert gas passes through the gas admission valve along with the remaining gaseous fuel in the gaseous fuel line into the cylinder due to a clearance of the gas admission valve.

* * * * *